C. A. Way.
Velocipede.
N° 71562. Patented Nov. 26, 1867.

Witnesses.

Inventor
C. A. Way

United States Patent Office.

CHARLES A. WAY, OF CHARLESTOWN, NEW HAMPSHIRE.

*Letters Patent No. 71,562, dated November 26, 1867.*

IMPROVEMENT IN VELOCIPEDES.

*The Schedule referred to in these Letters Patent and making part of the same.*

TO ALL WHOM IT MAY CONCERN:

Be it known that I, CHARLES A. WAY, of Charlestown, in the county of Sullivan, and State of New Hampshire, have invented certain new and useful Improvements in Velocipedes; and I do hereby declare that the following is a full, clear, and exact description of the same, reference being had to the accompanying drawings, making a portion of this specification, in which—

Similar letters of reference indicate corresponding parts in both figures.

The object of this invention is to provide a velocipede of extremely simple construction, which may be propelled with a very moderate expenditure of strength or power, and may also be turned or guided in any desired direction with very great convenience. The invention consists in two driving-wheels furnished with crank-wrists or handles, so arranged, in relation with the frame and seat of the apparatus, that the aforesaid wheels may be operated by the person using the velocipede without the employment of any intermediate devices for communicating motion to the said wheels. The invention further consists in a novel means of operating a guiding-wheel or caster, whereby the turning or guiding of the velocipede, when in use, is very materially facilitated.

To enable others to understand the construction and operation of my invention, I will proceed to describe it with reference to the drawings.

Figure 2:
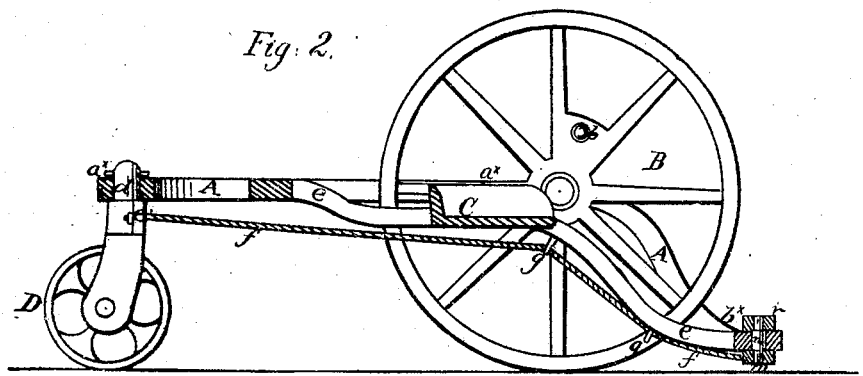
Figure 2 is a vertical longitudinal section of the same.
Figure 1:
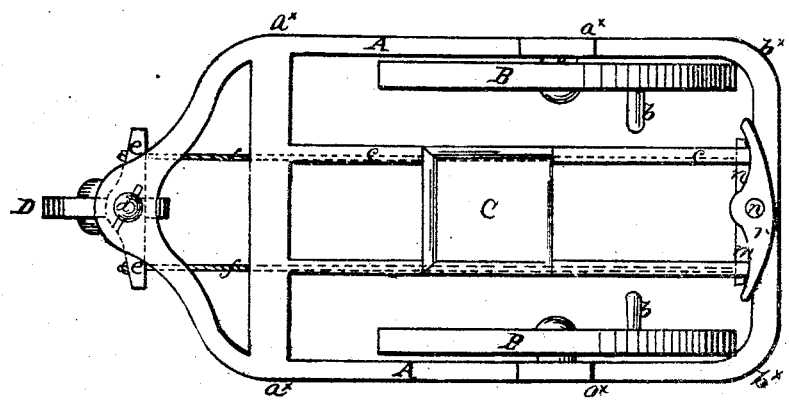
Figure 1 is a plan view of a velocipede constructed according to my invention.

The main frame of the velocipede is shown at A, and is furnished at each of its two sides with a short inwardly-projecting axle, $a$, the said axles having placed upon them the two driving or supporting-wheels B, each provided with an inwardly-projecting crank-wrist or handle, $b$. That portion of the frame A back of the axle $a$, is nearly or quite horizontal, as shown at $a^*$, but the forward part thereof is depressed, as shown in fig. 1. Situated between the wheels B are two longitudinal bars or braces $c$, upon which, in convenient proximity to the wheels B, is secured the seat C. The rearmost end of the frame A is furnished with a wheel or caster, D, working on a vertical arbor, $d$, which is provided with two laterally-extending arms $e$, from the outer end of each of which a stout cord, $f$, is extended through guiding-loops $g$, to the corresponding end of a bar, $m$, pivoted to the under side of the depressed forward end of the frame A, the upper end of the pivot $n$ having furthermore a lever, $r$, attached centrally to its upper end, as shown more plainly in fig. 1.

The person using the velocipede takes his place in the seat C, and grasping one of the crank-wrists in each hand, rotates the wheels B, thus propelling the apparatus, which may be guided in a measure by moving one of the wheels B faster than the other, as the case may require, but much more conveniently by moving the lever $r$ with the feet, and thus, through the agency of the bar $m$, cords $f$, and arms $e$, turning the arbor of the wheel or caster D into such position as will cause the same to guide or direct the velocipede in the desired direction, which may thus be very conveniently propelled or operated, with the expenditure of comparatively little strength on the part of the person using the same.

What I claim as my invention, and desire to secure by Letters Patent, is—

1. The two driving-wheels, furnished with the crank-wrists or handles arranged in relation with the main frame and seat, substantially as and for the purpose specified.

2. The lever $r$, bar $m$, and cords $f$, arranged in relation with each other and with the arms $e$ of the arbor of the caster-wheel, substantially as and for the purpose specified.

CHAS. A. WAY.

Witnesses:
GEO. W. HAMLIN,
E. J. FIFIELD.